US011455699B2

(12) United States Patent
Buttolo et al.

(10) Patent No.: US 11,455,699 B2
(45) Date of Patent: Sep. 27, 2022

(54) APPARATUS AND METHODS FOR QUEUEING TRANSPORTATION PROVIDERS AND PASSENGERS

(71) Applicant: Ford Motor Company, Dearborn, MI (US)

(72) Inventors: Pietro Buttolo, Dearborn Heights, MI (US); Stuart C. Salter, White Lake, MI (US); Annette Lynn Huebner, White Lake, MI (US); Paul Kenneth Dellock, Northville, MI (US); James Stewart Rankin, Novi, MI (US)

(73) Assignee: Ford Motor Company, Dearborn, MI (US)

( * ) Notice: Subject to any disclaimer, the term of this patent is extended or adjusted under 35 U.S.C. 154(b) by 549 days.

(21) Appl. No.: 16/346,658

(22) PCT Filed: Nov. 3, 2016

(86) PCT No.: PCT/US2016/060354
§ 371 (c)(1),
(2) Date: May 1, 2019

(87) PCT Pub. No.: WO2018/084846
PCT Pub. Date: May 11, 2018

(65) Prior Publication Data
US 2020/0058092 A1 Feb. 20, 2020

(51) Int. Cl.
*G06Q 50/30* (2012.01)
*G06Q 10/06* (2012.01)
*G06Q 30/02* (2012.01)
*H04L 67/52* (2022.01)

(52) U.S. Cl.
CPC ........ *G06Q 50/30* (2013.01); *G06Q 10/06316* (2013.01); *G06Q 10/063114* (2013.01); *G06Q 30/0281* (2013.01); *H04L 67/52* (2022.05)

(58) Field of Classification Search
CPC ........ G06Q 50/30; G06Q 10/02; G08G 1/202; G08G 1/20
See application file for complete search history.

(56) References Cited

U.S. PATENT DOCUMENTS

| 4,360,875 A | 11/1982 | Behnke |
| 7,110,359 B1 | 9/2006 | Acharya |

(Continued)

FOREIGN PATENT DOCUMENTS

| CN | 202058211 | 3/2011 |
| CN | 103198644 | 3/2013 |

(Continued)

OTHER PUBLICATIONS

D'Orey, P. M. (2014). Vehicular communications for efficient and sustainable mobility (10593369). Available from ProQuest Dissertations and Theses Professional. (1907044340). Retrieved from https://dialog.proquest.com/professional/docview/1907044340?accountid=131444 (Year: 2014).*

(Continued)

*Primary Examiner* — Michael P Harrington
(74) *Attorney, Agent, or Firm* — Brandon Hicks; Hanley, Flight & Zimmerman, LLC

(57) ABSTRACT

Apparatus and methods for queueing transportation providers and passengers are described. A method includes queuing in a first queue, first broadcast messages received from passenger mobile devices and queuing in a second queue, second broadcast messages received from transportation provider mobile devices. The method also includes comparing, via a processor, each of the first broadcast messages in the first queue to the second broadcast messages in the second queue to identify a match between one of the first broadcast messages and one of the second broadcast messages.

16 Claims, 7 Drawing Sheets

(56) References Cited

U.S. PATENT DOCUMENTS

| | | | |
|---|---|---|---|
| 7,610,208 B2 | 10/2009 | Salonen | |
| 2006/0059023 A1 | 3/2006 | Mashinsky | |
| 2015/0161752 A1* | 6/2015 | Barreto | G06Q 10/063114 |
| | | | 705/7.15 |
| 2016/0021154 A1* | 1/2016 | Schoeffler | H04L 51/046 |
| | | | 709/204 |
| 2016/0125735 A1 | 5/2016 | Tuukkanen | |
| 2017/0059336 A1* | 3/2017 | Huang | G01C 21/343 |
| 2017/0236235 A1* | 8/2017 | Frankert | G06Q 50/30 |
| | | | 705/13 |

FOREIGN PATENT DOCUMENTS

| | | |
|---|---|---|
| CN | 104299410 | 7/2013 |
| CN | 203894943 | 5/2014 |
| WO | 2018084846 | 5/2018 |

OTHER PUBLICATIONS

Vaitheesvaran, B. (Dec. 16, 2012). Adding zing to ridesharing. Business line Retrieved from https://dialog.proquest.com/professional/docview/1321449374?accountid=131444 (Year: 2012).*

International Searching Authority, "Search Report," issued in connection with International Patent Application No. PCT/US16/60354, dated Jan. 24, 2017, 3 pages.

Patent Cooperation Treaty, "International Preliminary Report on Patentability," issued in connection with International Patent Application No. PCT/US2016/060354, dated May 7, 2019, 8 pages.

International Searching Authority, "Written Opinion" issued in connection with International Patent Application No. PCT/US16/60354, dated Jan. 24, 2017, 7 pages.

* cited by examiner

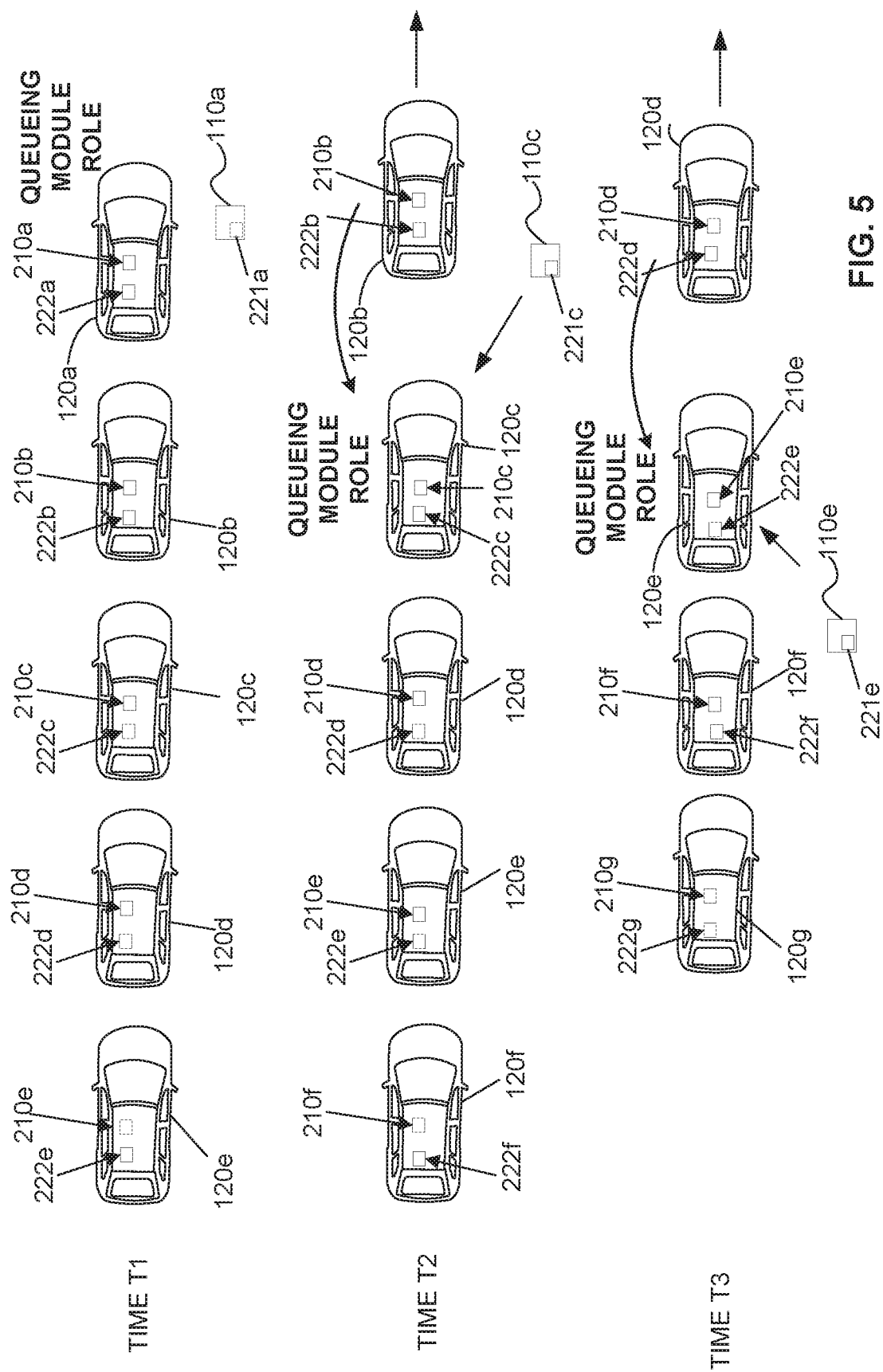

APPARATUS AND METHODS FOR QUEUEING TRANSPORTATION PROVIDERS AND PASSENGERS

FIELD OF THE DISCLOSURE

This disclosure relates generally to transportation services and, more particularly, to apparatus and methods for queueing transportation providers and passengers.

BACKGROUND

FIG. 1 depicts a conventional queueing apparatus for transportation providers and passengers. In the depicted example, a physical queue 100 is arranged outside of a building, facility, or public area 105 such as, but not limited to, a transportation hub (e.g., a train station, a bus terminal, an airport baggage claim area, etc.), a sporting arena or venue, a hotel, or other public area. Within the physical queue 100, prospective passengers 110a-110n, where "n" represents any integer, wait in line. Transportation providers 120a-120n, where "n" represents any integer, such as taxis, busses, and shuttles arrive via a roadway 125 adjacent the physical queue 100. Conventionally, a front-most passenger 110a is serviced by a front-most transportation provider 120a, the next passenger 110b is serviced by the next transportation provider 120b, the following passenger 110c is serviced by the following transportation provider 120c, and so on, such that each successive passenger is serviced by each successive transportation provider.

However, the passengers 110a-110n or groups of passengers 110a-110n (e.g., families, groups, etc.) have individual requirements (e.g., size of group, amount of luggage, disabilities, etc.) that may or may not be accommodated by the capabilities of many of the transportation providers 120a-120n arriving to service the physical queue 100. For example, the first passenger 110a may be one person with a single piece of luggage, readily accommodated by any of the transportation provider 120a-120n, but the third passenger 110c may have special needs (e.g., wheelchair, walker, etc.) and may not find accommodation by the third transportation provider 120c, with which the third passenger 110c is to be paired in this conventional system. Elderly people, parents with young children, groups or people with special needs or disabilities may find that a randomly arriving transportation provider 120a-120n does not satisfy their service requirement(s) and such passengers or service recipient(s) may be required to wait for another transportation provider able to accommodate such service requirement(s).

SUMMARY

In one example, a method includes queuing in a first queue, first broadcast messages received from passenger mobile devices, queuing in a second queue, second broadcast messages received from transportation provider mobile devices and comparing, via a processor, each of the first broadcast messages in the first queue to the second broadcast messages in the second queue to identify a match between one of the first broadcast messages and one of the second broadcast messages.

In another example, a queueing apparatus includes a first transceiver and a first device to receive transportation provider messages from transportation providers and passenger requests from passenger mobile devices. The first device includes a queueing manager to store the transportation provider messages in a first queue and to store the passenger requests in a second queue, a comparator to determine matches between the transportation provider messages and the passenger requests and a communicator to transmit via the transceiver to a passenger mobile device corresponding to a selected one of the passenger requests, responsive to a match between the selected one of the passenger requests and a selected one of the transportation provider messages, transportation provider information corresponding to the selected one of the transportation provider messages.

In another example, a tangible computer-readable storage medium comprising instructions that, when executed, cause a processor to, at least queue in a first queue, first broadcast messages received from passenger mobile devices, queue in a second queue, second broadcast messages received from transportation provider mobile devices and compare, via the processor, each of the first broadcast messages in the first queue to the second broadcast messages in the second queue to identify a match between one of the first broadcast messages and one of the second broadcast messages.

BRIEF DESCRIPTION OF THE DRAWINGS

FIG. 5 depicts another example queueing apparatus in accordance with teachings of this disclosure.

While the present disclosure is susceptible to various modifications and alternative forms, specific examples are shown and described herein. It should be understood, that the present disclosure is not limited to the particular forms and examples disclosed and instead covers all modifications, equivalents, embodiments, and alternatives falling within the spirit and scope of the present disclosure.

DETAILED DESCRIPTION

Disclosed herein are example queueing apparatus and methods for matching transportation requests by passengers 110a-110n (e.g., people desired transport, etc.) and transportation providers 120a-120n (e.g., taxis, shuttles, buses, including autonomous vehicles and non-autonomous vehicles, etc.). In some examples, the queueing apparatus and methods use inexpensive local devices to reduce cost, provide scalability, and/or minimize dependency on Internet access or access to cellular networks, which may be locally deficient (e.g., a lack of repeaters, use of cellular signal jammers by federal law enforcement entities, etc.).

Figure 1:
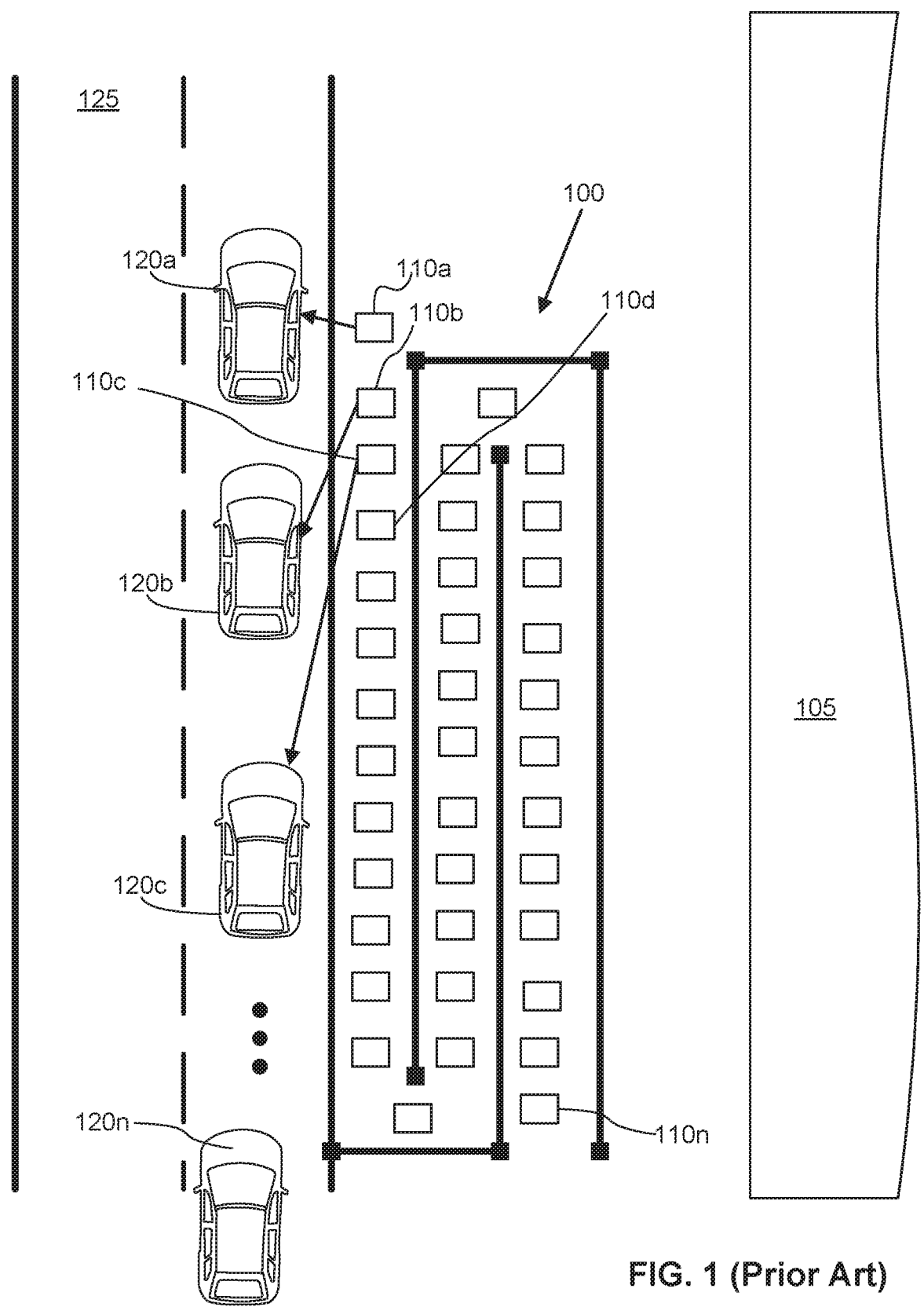
FIG. 1 depicts a conventional queueing apparatus for transportation providers and passengers.

Unlike the conventional queueing apparatus shown in FIG. 1, the example queueing apparatus described herein does not require a physical queue, such as the queue 100, in the public area 105. Instead, the example queueing apparatus matches the passengers 110a-110n and the transportation providers 120a-120n based on the service needs of the passengers 110a-110n and the service capabilities of the transportation providers 120a-120n. In accord with the example queueing apparatus described herein, requests for transportation by the passengers 110a-110n may be made on-the-fly and on-demand via broadcasts from passenger mobile devices (e.g., cellular phone, personal electronic device, wearable technology, Internet of Things (IoT) device, iWatch, Google Glass®, etc.), enhancing an efficiency of requesting transportation services and eliminating the need for a kiosk, terminal or other similar infrastructure with which the passengers 110a-110n must interface to arrange transportation. The example apparatus described herein also provides transportation service providers (or transportation providers) 120a-n with mobile devices, which may be disposed within the vehicles of the transportation providers. Similar to the passenger mobile devices, the transportation provider mobile devices cooperate with the apparatus described herein to enable the transportation providers 120a-120n to interact with the passengers 110a-110n (via their mobile devices) to arrange transportation in an efficient manner. Additionally, the use of such transportation provider mobile devices, which may be implemented at least in part using, for example, smart phones, tablets, lap top computers, mobile data terminals (MDT), personal electronic devices, wearable technology, Internet of Things (IoT) device, iWatch, Google Glass®, etc., further eliminates the need for infrastructure at transportation hubs or other locations at which passengers and transportation providers interact.

The example queueing apparatus described herein also enables passengers 110a-110n and transportation providers 120a-120n to independently determine a desired pick-up location, enabling boarding of transportation providers 120a-120n by passengers 110a-110n simultaneously in multiple locations. This queueing process increases efficiency by eliminating the physical bottleneck imposed on the passengers 110a-110n and the transportation providers 120a-120n at the physical queue 100.

Figure 2:
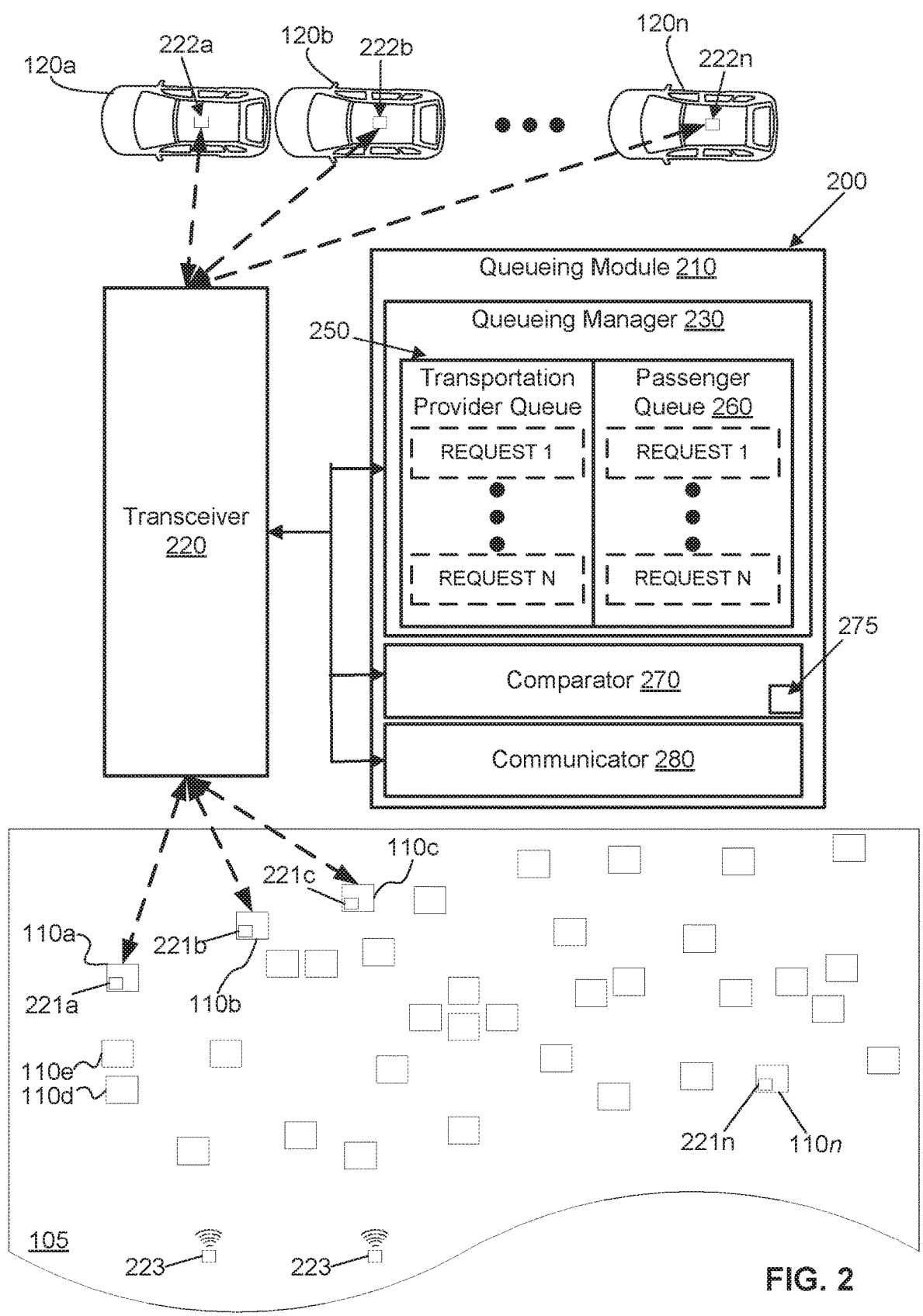
FIG. 2 is an example queueing apparatus in accordance with teachings of this disclosure.

FIG. 2 depicts an example queueing apparatus 200 including an example queueing module 210 that communicates with the passengers 110a-110n and the transportation providers 120a-120n via an example transceiver 220. The passengers 110a-110n bear passenger mobile devices 221a-221n anywhere on or about their person (e.g., cellular phone, personal electronic device, wearable technology, Internet of Things (IoT device), iWatch, Google Glass®, etc.) that broadcast individualized passenger requests for a desired transportation service. The transportation providers 120a-120n include transportation provider mobile devices 222a-222n anywhere on or about the vehicles corresponding to the transportation providers 120a-120n. The transportation provider mobile devices 222a-222n broadcast individualized transportation provider messages advertising a transportation service and associated transportation service capabilities that can be provided. In some examples, the passenger mobile devices 221a-221n are cellular telephones configured to interact with the queueing apparatus 200 via an antenna (e.g., a Bluetooth® Low Energy ("BLE") antenna) and supporting hardware, firmware or software.

In some examples, the passenger mobile devices 221a-221n are not personal devices borne by the passengers 110a-110n but, rather, external devices 223 situated in or near the public area 105 to sense one or more biometric characteristics of passengers 110a-110n in the public area 105. For example, the external devices 223 may include cameras providing facial recognition and/or gait detection capabilities. In such examples, the passengers 110a-110n pre-register service requests and preferences (e.g., automated approval, conditioning of acceptable queueing matches, etc.) together with their biometric characteristics. The external devices 223, or associated devices (e.g., connected processor, connected computer, connected microcontroller unit (MCU), etc.) then function as the passenger mobile devices 221a-221n in the queueing apparatus 200.

In some examples, the transportation provider mobile devices 222a-222n include cellular telephones or mobile data terminals (MDT) configured to interact with the queueing apparatus 200 via an antenna (e.g., a Bluetooth® Low Energy ("BLE") antenna) and supporting hardware, firmware or software. By way of example, where the passenger mobile devices 221a-221n and the transportation provider mobile devices 222a-222n are BLE devices, a communication range of such devices is about 100 feet with BLE 4.x and about 500 feet with BLE 5.x, which is extendible with LoRa® (wireless technology providing low-power, wide-area networks (LPWANs) for machine-to-machine (M2M) and Internet of Things (IoT) applications) or other LPWAN gateway, such as a LoRa® wireless RF microchip or chipset.

Unlike the conventional queueing apparatus shown in FIG. 1, the example queueing apparatus 200 does not require a physical queue, such as the queue 100, in the public area 105. Instead, the example queueing apparatus 200, via the queueing module 210 matches the passengers 110a-110n and the transportation providers 120a-120n based on the needs of the passengers 110a-110n and these service capabilities of the transportation providers 120a-120n. The queueing apparatus 200 enables requests for transportation by the passengers 110a-110n to be made on-the-fly and on-demand via broadcasts from the passenger mobile devices 221a-221n, thereby enhancing an efficiency with which the transportation services offered by the transportation providers 120a-120n can be obtained. Further, the queueing apparatus 200 eliminates the conventional requirement for passengers 110a-110n to wait in a physical queue, such as the queue 100, and the corresponding requirement for transportation providers 120a-120n to form a line at such physical queue 100 to serially service the passengers 110a-110n. Thus, in accord with the queueing apparatus 200, the vehicles of the transportation providers 120a-120n can be boarded by the passengers 110a-110n simultaneously in multiple locations, increasing efficiency and minimizing waiting time.

The example queueing module 210 includes an example queueing manager 230, which includes an example transportation provider queue 250 and an example passenger queue 260. The example queueing module 210 also includes an example comparator 270 and an example communicator 280.

The queueing module 210 of FIG. 2 is to receive broadcast requests (e.g., transportation-need advertisements, etc.) from the passenger mobile devices 221a-221n via the transceiver 220. The queueing module 210 is to store the broadcast passenger requests in the passenger queue 260 via the queueing manager 230. In some examples, the passenger request messages are generally stored in the passenger queue 260 in a first-in-first-out (FIFO) order. However, as described in more detail below, the order in which the passenger request messages are stored may be varied from a FIFO order based on certain characteristics of the passengers 110a-110n (e.g., special needs such as handicap(s), elderly status, the presence of small children, etc.) Likewise, the queueing module 210 of FIG. 2 is to receive broadcast transportation availability messages (e.g., transportation characteristics and amenities, etc.) from the transportation provider mobile devices 222a-222n via the transceiver 220. The queueing module 210 is to store the transportation provider messages in the transportation provider queue 250 via the queueing manager 230. The transportation provider messages may be generally stored in a FIFO order or, to suit the needs of a particular application, the order in which the messages are stored may be varied based on certain characteristics of the transportation providers 120a-120n. As described below, the queueing module 210 then matches selected passenger request messages in the passenger queue 260 with selected transportation provider messages in the transportation provider queue 250.

The example transceiver 220 includes an example transmitter and an example receiver. In some examples, the transceiver 220 is a full-duplex transceiver designed to allow reception of signals during transmission periods, with the transmitter and the receiver operating on different frequencies so the transmitted signals do not interfere with received signals. In some examples, the transceiver 220 is a half-duplex transceiver wherein transmission and reception of signals is performed on the same frequency at different times. In some examples, the transceiver 220 is a wireless microcontroller unit (MCU) module to implement Bluetooth® low energy (BLE) applications, ZigBee® (IEEE 802.15.4-based specification), 6LoWPAN, IEEE 802.15.4 device applications, or other wireless protocol(s). In some examples, the transceiver 220 may be implemented using the Texas Instruments CC2650MODA SimpleLink™ Bluetooth® low energy Wireless MCU Module. In some examples, the transceiver 220 uses a wireless ad hoc network (WANET) or a short range wireless transceiver disposed in a transportation hub. There are significant advantages to the use of an example queueing apparatus 200 and example transceiver 220 as disclosed, as the queueing apparatus 200 may be implemented with inexpensive, low power hardware, such as a BLE MCU.

The queueing manager 230 is to store the broadcast passenger request messages in the passenger queue 260 and the broadcast transportation provider service availability messages in the transportation provider queue 250. The example transportation provider queue 250 includes all pending or unfulfilled transportation provider availability messages. To illustrate, in one example, the public area 105 is an airport and the transportation provider queue 250 includes, at one particular moment, an availability message from the first transportation provider 120a. The first transportation provider 120a provides a vehicle that it is able to accommodate a maximum of 4 passengers, and 4 large suitcases. Further, the vehicle of the first transportation provider 120a is unable to accommodate a wheelchair and is willing to take customers only to hotel 1 and hotel 2. At that same moment, the transportation provider queue 250 includes, an availability message from the second transportation provider 120b having vehicle characteristics suitable to accommodate a maximum of 2 passengers, and 2 large suitcases. The vehicle of the second transportation provider 120b is able to accommodate a wheelchair and is willing to take customers only to hotel 1, hotel 2 or hotel 3.

The passenger queue 260 includes all pending or unfulfilled broadcast request messages from the passengers 110a-110n. To illustrate, continuing with the above example, the example passenger queue 260 includes, at the particular moment referenced in the example above, messages from a first group of passengers 110a-110b (2 passengers) with 3 large suitcases destined for hotel 1, a message from passenger 110c (1 passenger) with 1 carry-on bag destined for hotel 2, and messages from a second group of passengers 110d-110e (2 passengers) with 1 suitcase destined and requiring wheelchair access destined for hotel 3.

The example comparator 270, via a queueing algorithm, determines matches between the transportation provider service availability messages and the passenger request messages. In some examples, the example queueing algorithm employs a FIFO approach in which the message from the first passenger 110a in the example passenger queue 260 is initially paired with the message from the first transportation provider 120a in the example transportation provider queue 250. To illustrate a FIFO algorithm applied to the example of FIG. 2, the passenger 110a is the first person to arrive in the public area 105 (e.g., a baggage claim or a transit area of an airport, etc.). The passenger mobile device 221a of the first passenger 110a broadcasts (e.g., via BLE, RF, etc.), automatically or on-demand, a transportation service request message that is received by the transceiver 220. In response to receipt of the request message, the queueing manager 230 assigns the passenger 110a to a first position in the example passenger queue 260 by storing the request message sent via the passenger mobile device 221a in a highest priority position in the passenger queue 260.

The transportation provider 120a is the first vehicle to arrive at or near a pick-up area of the public area 105 (e.g., a baggage claim or a transit area of an airport, etc.). The transportation provider mobile device 222a of the transportation provider 120a broadcasts (e.g., via BLE, RF, etc.), automatically or on-demand, a service availability message that is received by the transceiver 220. The queueing manager 230 assigns the transportation provider 120a to a first position in the transportation provider queue 260 by storing the service availability message sent by the transportation provider mobile device 222a in a highest priority position in the transportation provider queue 260. After arrival of the passenger 110a, the passenger 110b arrives in the public area 105 and that passenger's mobile device 221b broadcasts (e.g., via BLE, RF, etc.), automatically or on-demand, a second request message that is received by the transceiver 220. The queueing manager 210 assigns the passenger 110b to a second position in the passenger queue 260 by storing the second request message in a second to the highest priority position in the passenger queue 260. The transportation provider 120b then arrives at or near a pick-up area of the public area 105 and the mobile device device 222b of the transportation provider 120b broadcasts (e.g., via BLE, RF, etc.), automatically or on-demand, a service availability message that is received by the transceiver 220. The queueing manager 210 assigns the transportation provider 120b to a second position in the transportation provider queue 250 by storing the message sent by the transportation provide mobile device 222b in the second highest priority position in the transportation provider queue 250.

When using a FIFO queuing algorithm, the comparator 270 initially pairs or matches the passenger 110a (i.e., the passenger assigned to the highest priority position in the queue 260) with the transportation provider 120a (i.e., the transportation provider assigned to the highest priority position in the queue 250). However, as is described below in relation to the methods of FIGS. 3 and 4A-4B, the service needs associated with the passenger 110a (such needs are conveyed in the request message sent by the passenger 110a and stored in the passenger queue 260) may, not sufficiently match the service capabilities provided by the first transportation provider 120a. In such a case, a potential pairing or match with the next highest priority transportation provider (i.e., the transportation provider 120b) is evaluated. This process continues until a match is found or all of the transportation providers having corresponding messages in the transportation provider queue 250 have been evaluated sequentially (i.e., in the order in which they are stored in the queue 250) against the service needs of the passenger 110. If a match is found, the passenger 110a, as described in detail below, may arrange (i.e., book) the service of the matching transportation provider or, alternatively, refuse the proposed match and continue the search for another transportation provider. In any event, once the request of the passenger 110a (i.e., the highest priority passenger) has been processed in the above-described manner, the request of the next highest priority passenger (i.e., the passenger 110b) is processed in a similar manner. Namely, the service needs of the passenger 110b contained in the corresponding message stored in the passenger queue 260 are compared sequentially to the service capabilities of the transportation providers as stored in the corresponding messages in the transportation provider queue 250 in the order in which the messages are stored in the queue 250. Thus, the passenger messages in the passenger queue 260 are processed sequentially (i.e., from highest to lowest priority) and, when processed, each of the passenger messages is evaluated sequentially (i.e., from a highest to a lowest priority) for a potential match against the transportation provider messages in the transportation provider queue 250.

While a FIFO queueing algorithm is described above, other queuing algorithms could be used instead. Further, while passenger messages and transportation provider messages may generally be stored in the respective queues 260, 250 in a FIFO order (i.e., the temporal order in which the messages are received by the queuing manager 230), the order in which the messages are stored and, thus, evaluated for potential matches, may be varied or changed from a purely FIFO order based on certain predetermined service needs (e.g., handicap status, passenger group size, passenger age(s), etc.) and/or transportation provider capabilities or limitations (e.g., size of vehicle, service rating, booking status, etc.).

To determine whether a match exists as between a transportation provider and a passenger request, as an initial starting point for comparison of the messages in the transportation provider queue 250 and the passenger queue 260, the comparator 270 compares details in the passenger request message to the details in a transportation provider availability message. In some examples, the transportation provider service availability messages include data or information relating to terms for an offer (e.g., pricing for transportation services, etc.) or transportation characteristics of the transportation provider (e.g., number of available seats in the corresponding vehicle, handicapped accessibility information, cargo capacity, operating range of services provided, make and model of vehicle, level of cleanliness, information on driver (if any), service rating, etc.). In some examples, the passenger request messages include data or information relating to a number of passengers, a required cargo capacity (e.g., number of pieces of luggage, mobility assistance devices, etc.), destination, passenger comfort preferences, conditions for an automated acceptance of a transportation provider offer (e.g., acceptable pricing for transportation services, first available, etc.). The comparator 270 may determine that a passenger request message matches a transportation provider service availability message if all of the service needs or requirements of a passenger request message are met by the service capabilities of a transportation provider. Alternatively, a match may be determined if a sufficient number of the service needs of a passenger request message are met by the service capabilities found in a transportation provider service availability message. For example, this sufficient number of service needs might include one or more must have or critical requirements or this sufficient number may be a score based on a number of requirements met and/or a weighted score based on the number and relative importance of the requirements.

To illustrate an example comparison by the comparator 270, the transportation provider 120a may indicate in a transportation provider service availability message details of an offer for service (e.g., the transportation provider 120a can accommodate 3 persons and up to 3 large pieces of luggage at a rate of $2.40/mile, with a fee of $3.30 to get into the vehicle) and a request message from the passenger 110a may indicate detailed service requirements (e.g., one passenger, one piece of luggage, with an acceptable rate of $2.50/mile with additional attendant charges (e.g., flag drop, luggage fee, etc.) of up to $5.00). In this instance, the comparator 270 determines that a match exists.

In some examples, the example queueing algorithm may vary or modify the order in which messages are stored in the queues 250 and 260 from a purely FIFO order (i.e., a temporal order in which messages are initially received). In this manner, the queueing algorithm change the priorities of the messages in the queues from a purely FIFO (i.e., prioritization based on time of receipt in the queues) to be based on factors other than the time or receipt of the messages. For example, a ranking of the passengers 110a-110n within the passenger queue 260 may be adjusted (e.g., increased or decreased) by the queueing manager 230 based in part on a relative classification of the passengers 110a-110n. In some examples, the classification of passengers 110a-110n is influenced by a membership in a particular class (e.g., a member organization, a frequent flyer membership, a designated card holder, etc.), a paid fee, a subscription to a queueing service, or the like.

In some examples, discussed below in relation to the queueing methods of FIGS. 3 and 4A-4B, the communicator 280 and the transceiver 220 broadcast to the passenger mobile devices 221a-221n information relating to matching transportation providers. This broadcast information may include offers for service, which may be accepted or rejected by the passengers 110a-110n. In some examples, the broadcast information for the matching transportation providers includes characteristics of the transportation (e.g., number of available seats, handicapped accessibility information, cargo capacity, operating range of services provided, make and model of vehicle, level of cleanliness, information on driver (if any), etc.) or a proposed pick-up or service location. In some examples, the information for the matching transportation provider includes terms for an offer of transportation service (e.g., pricing for transportation services, etc.) by the transportation provider that the passenger may accept or reject.

In some examples, if the passenger rejects an offer by a transportation provider, the queueing manager 230 causes the comparator 270 to determine whether another transportation provider message in the transportation provider queue 250 (e.g., a next transportation provider in the transportation provider queue 250, etc.) matches the passenger request. In some examples, if the passenger rejects a proposed match with a transportation provider, the queueing manager 230 may reassign the passenger (i.e., the request message from the passenger) to a different position (priority) within the passenger queue 260. For example, the queueing manager 230 may lower a priority of the passenger within the passenger queue 260 by one or more positions relative to other passengers in the passenger queue 260.

Where broadcast information for a matching transportation provider does include terms for an offer of transportation service by the transportation provider (e.g., 120a) that the passenger (e.g., 110a) accepts, the passenger's mobile device (e.g., 221a) broadcasts to the communicator 280 via the transceiver 220 the acceptance of the transportation provider offer terms. The communicator 280 broadcasts to the transportation provider (e.g., 120a) mobile device (e.g., 222a), via the transceiver 220, a service location (e.g., a designated pick-up area). The communicator 280 also broadcasts to the passenger (e.g., 110a) mobile device (e.g., 221a), via the transceiver 220, the service location (e.g., a designated pick-up area) if such information was not previously broadcast to the passenger. Following broadcast of information to the matched selected passenger and selected transportation provider, the queueing manager 230 updates the passenger queue 260 and the transportation provider queue 250 to remove the corresponding selected transportation provider service availability message and selected passenger request message.

The communicator 280 of the queueing module 210 includes a wireless and/or a hardwired communication pathway to enable wireless communication and/or hardwired communication between the communicator 280 and an external system (not shown), which may include, for example, a local computer, a remote computer, a local network, and/or a remote network. The communicator 280 includes, by way of example and not limitation, a wireless communication device, a Bluetooth device, a Bluetooth Low Energy (BLE) or Bluetooth Smart (Version 4.0+) device, a frequency hopping spread spectrum communication device, an adaptive frequency-hopping spread spectrum communication device or a radio frequency communication device.

Figure 3:
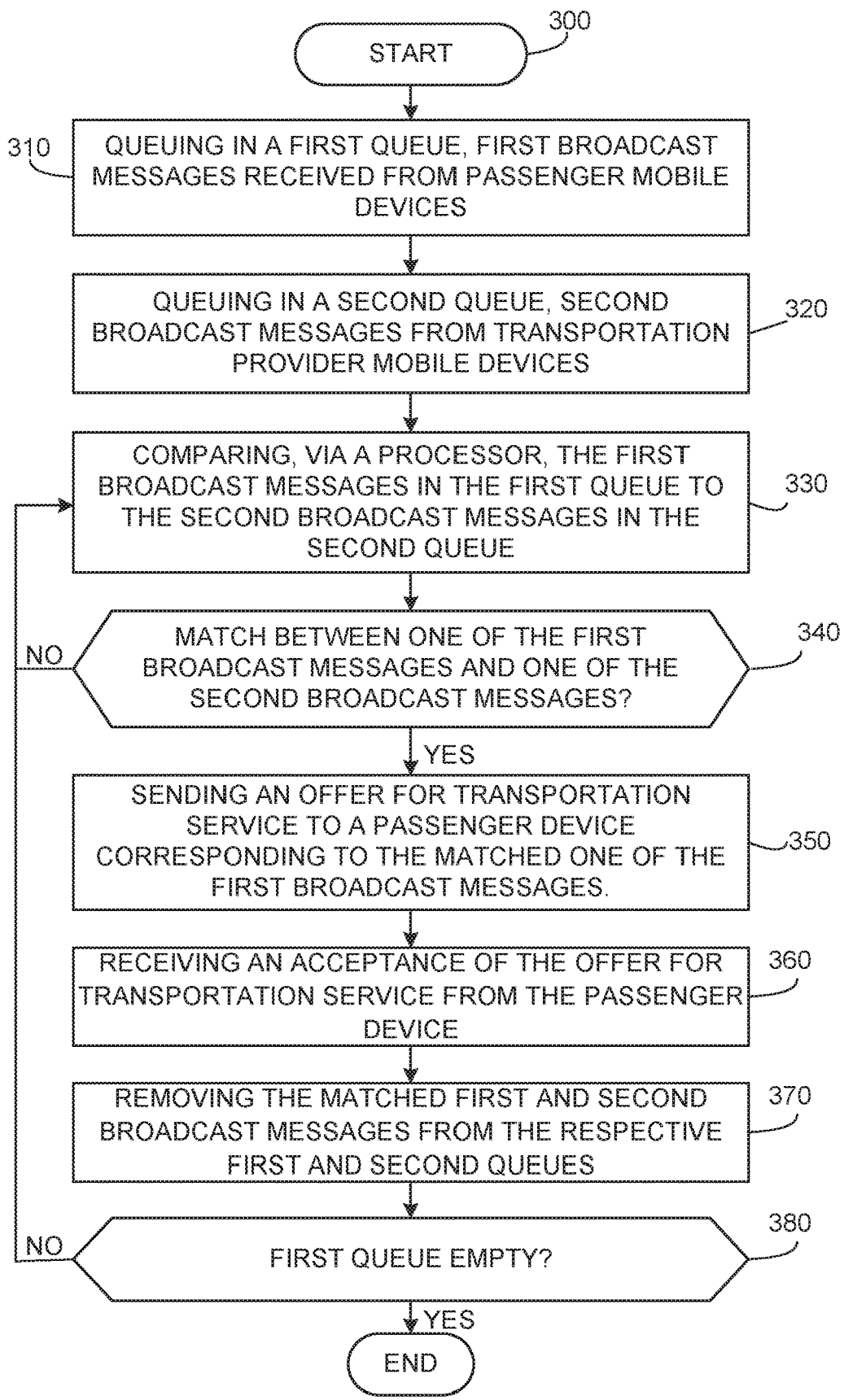
FIG. 3 is a flowchart of an example method in accordance with teachings of this disclosure.

An example method 300 for implementing the example queueing apparatus 200 and example queueing module 210 of FIG. 2 is shown in FIG. 3. The example method 300 may be implemented using machine readable instructions that comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the example flowchart illustrated by way of example in FIGS. 3 and 4A-4B, many other methods of implementing the example queueing apparatus 200 and the example queueing module 210 may alternatively be used. For example, the order of execution of the blocks may be changed, and/or some of the blocks described may be changed, eliminated, or combined.

As mentioned above, the example queueing method of FIG. 3, or other processes disclosed herein, may be implemented using coded instructions (e.g., computer and/or machine readable instructions) stored on a tangible computer readable storage medium such as a hard disk drive, a flash memory, a read-only memory (ROM), CD, DVD, a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIG. 3 or FIGS. 4A-4B, other processes disclosed herein, may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Turning in detail to FIG. 3, the example queueing method 300 queues in a first queue, such as the passenger queue 260, first broadcast messages received from the passenger mobile devices 221a-221n (block 310). In block 320, the queueing method 300 queues in a second queue, such as transportation provider queue 250, second broadcast messages received from the transportation provider mobile devices 222a-222n.

In block 330, the queueing method 300 compares, via the comparator 270, the first broadcast messages (e.g., passenger request messages) in the first queue (e.g., the passenger queue 260) to the second broadcast messages (e.g., transportation provider service availability messages) in the second queue (e.g., the transportation provider queue 250), in accord with a queueing algorithms as described above. For example, the queueing method 300 compares, via comparator 270, the passenger request messages in the passenger queue 260 to the transportation provider service availability messages in the transportation provider queue 250.

In block 340, the queueing method 300 determines whether the comparator 270 identified a match between one of the first broadcast messages and one of the second broadcast messages. If the result of this inquiry is a "No," the queueing method 300 returns to block 330 to perform another comparison via the comparator 270. If the result of this inquiry is a "Yes," the queueing method 300 proceeds to block 350 to send an offer for transportation service to a passenger mobile device (e.g., 221a) corresponding to the matched one of the first broadcast messages.

In block 360, the queueing method 300 receives, from the passenger mobile device (e.g., 221a) corresponding to the matched one of the first broadcast messages, an acceptance of the offer for transportation service. The queueing method 300 then, in block 370, removes the matched first and second broadcast messages from the respective first and second queues (e.g., the passenger queue 260 and the transportation provider queue 250).

In block 380, the queueing method 300 determines whether the first queue (e.g., passenger queue 260) is empty. If the result of this inquiry is "Yes," the queueing method 300 ends. If the result of this inquiry is "No," and the first queue is not empty, the queueing method 300 control returns to block 330 where the queueing method 300 continues to compare the first broadcast messages in the first queue to the second broadcast messages in the second queue.

Figure 4A:
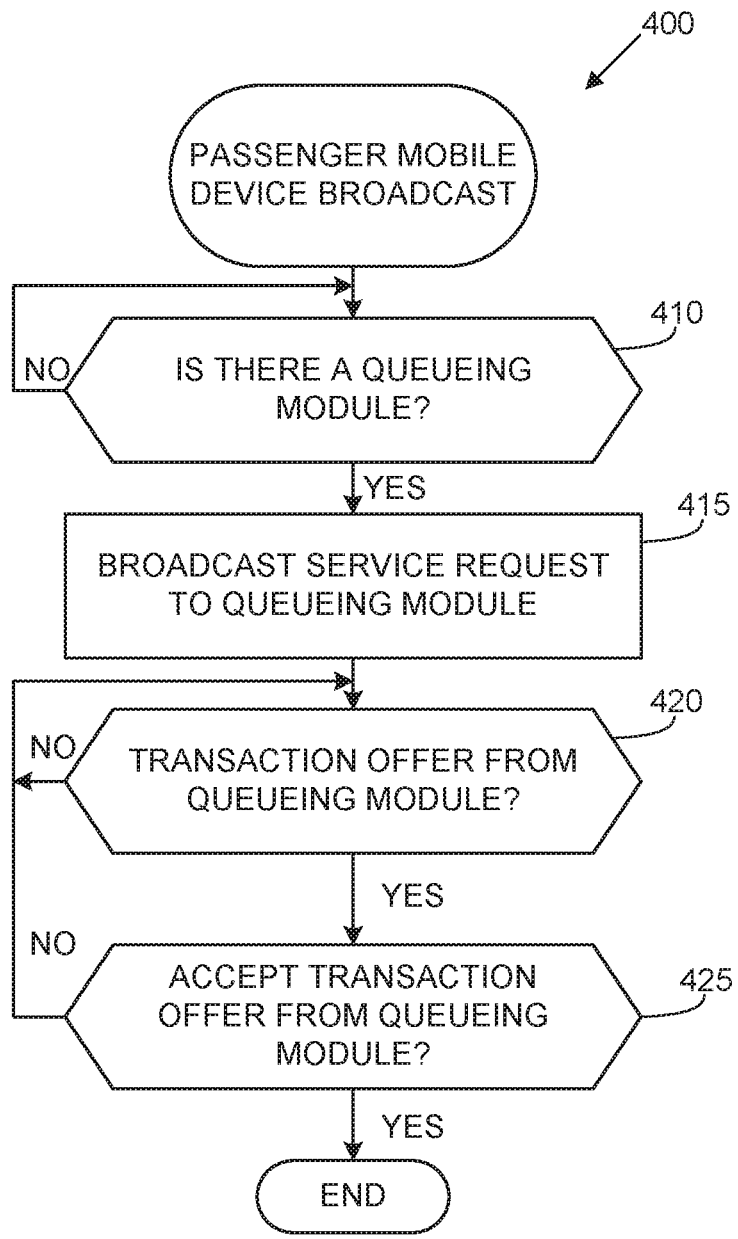
FIG. 4A is a flowchart of another example method in accordance with teachings of this disclosure.

FIG. 4A is a flowchart of an example method 400 that may be used by passenger mobile devices (e.g., 221*a*-221*n*) to interact with the queuing module 210 of FIG. 2. In block 410, the passenger mobile device (e.g., 221*a*) attempts to establish communications with the queuing module 210 to determine the presence of an active queuing module. If the passenger mobile device does not receive a response from the queuing module 210, indicating that there is no queuing module in range, the passenger mobile device (e.g., 221*a*) returns to block 410 and continues to attempt communication with an active queuing module.

If the passenger mobile device receives a response from an active queuing module 210 indicating that there is a queuing module in range (block 410 is "Yes"), then the passenger mobile device (e.g., 221*a*) broadcasts, in block 415, a passenger request message (e.g., a transportation request and related requirements, etc.) to the transceiver 220. In some examples, a passenger request message may include information relating to a number of passengers, a required cargo capacity (e.g., number of pieces of luggage, mobility assistance devices, etc.), destination, passenger comfort preferences, conditions for an automated acceptance of a transportation provider offer (e.g., acceptable pricing for transportation services, first available, etc.).

In block 420, the passenger mobile device (e.g., 221*a*) is in a waiting mode (i.e., block 420 is "No") until it receives a transaction offer from the example queuing module 210 (block 420 is "Yes") following a determination by the example queuing module 210 that a match exists between the passenger request message and a transportation provider (e.g., 120*a*) service availability message. In some examples, the transportation provider message includes terms for an offer (e.g., pricing for transportation services, etc.) or characteristics of the transportation (e.g., number of available seats, handicapped accessibility information, cargo capacity, operating range of services provided, make and model of vehicle, etc.).

In block 425, the passenger, via the passenger mobile device (e.g., 221*a*), is enabled to accept or reject the transaction offer. If the passenger rejects the transaction offer (block 425 is "No") control passes back to the example queuing module 210 to determine another matching transaction offer. If the passenger accepts the transaction offer via the passenger mobile device (e.g., 221*a*) (block 425 is "Yes"), control passes back to the queuing module 210 to determine if the acceptance by the passenger is reciprocated by an acceptance from the matched transportation provider. If so, the queuing module 210 proceeds to fulfil the transaction offer by providing relevant transportation provider information to the passenger mobile device (e.g., 221*a*) and by providing relevant passenger information to the transportation provider mobile device (e.g., 222*a*).

Figure 4B:
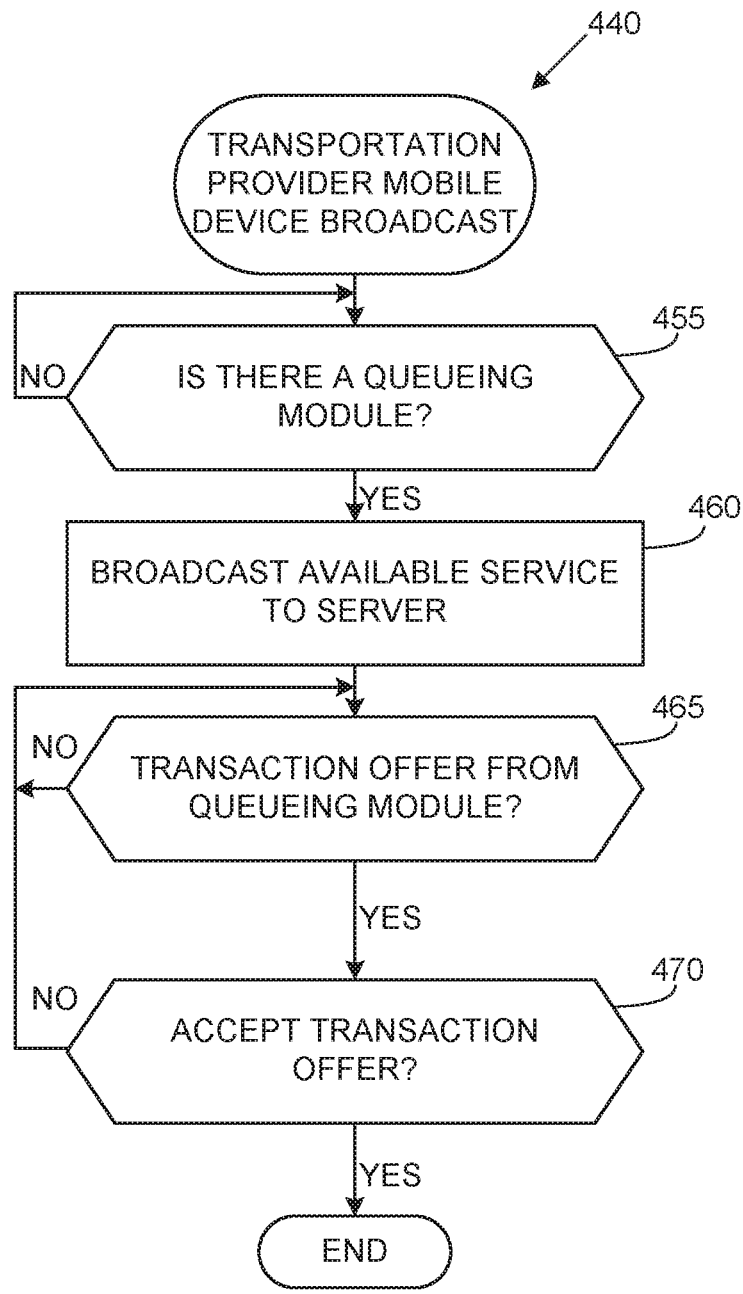
FIG. 4B is a flowchart of yet another example method in accordance with teachings of this disclosure.

FIG. 4B is a flowchart of an example method 440 by which transportation provider mobile devices (e.g., 222*a*-222*n*) may interact with the queuing module 210. In block 455, the transportation provider mobile device (e.g., 222*a*) attempts to communicate with the queuing module 210. If the transportation provider mobile device does not receive a response from a queuing module 210, indicating that there is no queuing module in range, the transportation provider mobile device (e.g., 222*a*) returns to block 455 and continues to attempt to communicate with an active queuing module.

If the transportation provider mobile device (e.g., 222*a*) receives a response from a queuing module 210, indicating that there is a queuing module in range (Block 455 is "Yes"), then the transportation provider mobile device (e.g., 222*a*) broadcasts, in block 460, a transportation provider service availability message to the queuing module 210. In some examples, a transportation provider service availability message may include, for example, terms for an offer (e.g., pricing for transportation services, etc.) or characteristics of the transportation (e.g., number of available seats, handicapped accessibility information, cargo capacity, operating range of services provided, make and model of vehicle, level of cleanliness, information on driver (if any), etc.).

In block 465, the transportation provider mobile device (e.g., 222*a*) is in a waiting mode (i.e., block 465 is "No") until it receives a transaction offer from the queuing module 210 (block 465 is "Yes") following a determination by the queuing module 210 that a match exists between the transportation provider service availability message and a passenger request message (e.g., 120*a*). In some examples, such as is represented in the example of FIG. 4B, the transportation provider is provided the ability, in blocks 465-470, to individually accept or reject an offer in a passenger request or counter-offer from a passenger. Thus, in such examples, both the passenger and the transportation provider are free to accept or reject an offer from the other party. In some examples, rather than a binary ability to accept or reject an offer, the passenger and the transportation provider are permitted to engage in additional iterations of communicated requests or offerings prior to acceptance or rejection of the match by the comparator 270.

In the example of FIG. 4B, in block 470, the transportation provider, via the transportation provider mobile device (e.g., 222*a*), is enabled to accept or reject the transaction offer. If the transportation provider rejects the transaction offer (block 470 is "No") control passes back to the queuing module 210 to determine another matching transaction offer. If the transportation provider accepts the transaction offer via the transportation provider mobile device (e.g., 222*a*) (block 470 is "Yes"), control passes back to the queuing module 210 to fulfil the transaction offer, such as was described above, by providing relevant transportation provider information to the passenger mobile device (e.g., 221*a*) and by providing relevant passenger information to the transportation provider mobile device (e.g., 222*a*).

FIG. 5 depicts another example queuing apparatus and method wherein a number of transportation providers 120*a*-120*e* (e.g., transportation providers in the illustrated example) are shown in or near a pick-up area (not shown) for passengers at TIME T1. At TIME T1, the transportation provider 120*a* is at a pick-up point to service passenger 110*a* with the transportation providers 120*b*-120*e* arriving behind to pick-up their matched passengers.

At TIME T1, the operations of the queuing module 210, as described herein with respect to the example queuing methods of FIG. 3 and FIGS. 4A-4B, are performed by the transportation provider 120*a* via a queuing module 210*a*, which may be a dedicated device borne by the transportation provider 120*a* or which may be included in the transportation provider mobile device 222*a*. Additionally, the transceiver 220 may be a dedicated device borne by the transportation provider 120*a* or may be included in the mobile device 222*a*.

As the transportation provider 120*a* is no longer participating in the queuing methods, after having been matched with a passenger 110*a* and removed from the transportation provider queue 250, the transportation provider 120*a* passes the queuing module role for the queuing module 210*a* and the current transportation provider queue 250 and passenger queue 260 to another transportation provider 120*b* via the mobile device 222*a* or transceiver 220. In some examples, the transfer of responsibility for the operations of the queueing module 210 from a first transportation provider (e.g., 120a) to a second transportation provider (e.g., 120b) is triggered by a predetermined control transfer condition, such as by a movement of the first transportation provider away from a second transportation provider (e.g., a distance, an acceleration, a velocity, etc.), a movement of the first transportation provider away from a predetermined area (e.g., a pick-up area, an area in which the second transportation provider queueing module 210b is disposed, etc.), or a removal of the first transportation provider from the transportation provider queue 250. The above examples are non-limiting and other triggering events can be used to transfer responsibility for the queueing method from a first transportation provider to a second transportation provider.

The receiving transportation provider (e.g., 120b) mobile device 222b, or a dedicated device (e.g., a queueing module 210b and transceiver 220) borne by the transportation provider 120b, is then to perform the queueing module role with respect to the example queueing methods of FIG. 3 and FIGS. 4A-4B via the queueing module 210b from the point at which the queueing module 210a left off. In some examples, the queueing module 210b is a dedicated device borne by the transportation provider 120b or is included in the mobile device 222b. In some examples, the transceiver 220 is a dedicated device borne by the transportation provider 120b or is included in the mobile device 222b. At TIME T2, the departing transportation provider 120b passes the queueing module role, and the current transportation provider queue 250 and passenger queue 260, from the queueing module 210b to another transportation provider queueing module (e.g., 210c, as shown in the illustrated example of FIG. 5) via the mobile device 222b or a transceiver 220 operatively associated with the queueing module 210b.

At TIME T3, the departing transportation provider 120d passes the queueing module role, and the current transportation provider queue 250 and passenger queue 260, from the queueing module 210d to another transportation provider queueing module (e.g., 210e, as shown in the illustrated example of FIG. 5) via the mobile device 222d or a transceiver 220 operatively associated with the queueing module 210d.

The transportation provider queueing modules 210a-210n thus pass control of the queueing process sequentially, or optionally non-sequentially (e.g., skipping one or more closely positioned transportation providers to decrease a number of handoffs, etc.) from one queueing module (e.g., 222d) to another queueing module (e.g., 222f).

While an example manner of implementing the example methods set forth in FIGS. 3-4B and the example of FIG. 5, is illustrated in FIG. 2, one or more of the elements, processes and/or devices illustrated in FIG. 2 may be combined, divided, re-arranged, omitted, eliminated and/or implemented in any other way. Further, the example queueing module 210, example queueing manager 230, example transportation provider queue 250, example passenger queue 260, example comparator 270, example queueing algorithm, and example communicator 280 of FIG. 2 may be implemented by hardware, software, firmware and/or any combination of hardware, software and/or firmware. Thus, for example, the example queueing module 210, example queueing manager 230, example transportation provider queue 250, example passenger queue 260, example comparator 270, example queueing algorithm and example communicator 280 of FIG. 2, or other examples expressly or implicitly disclosed herein could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the example queueing module 210, example queueing manager 230, example transportation provider queue 250, example passenger queue 260, example comparator 270 and example communicator 280 illustrated herein are hereby expressly defined to include a tangible computer readable storage device or storage disk such as a solid state memory device, a CD-ROM, a digital versatile disk (DVD), a compact disk (CD), a Blu-ray disk, etc. storing the software and/or firmware. Further still, the example queueing module 210, example queueing manager 230, example transportation provider queue 250, example passenger queue 260, example comparator 270, example queueing algorithm and example communicator 280 of FIG. 2 may include one or more elements, processes and/or devices in addition to, or instead of, those illustrated in FIG. 2, and/or may include more than one of any or all of the illustrated elements, processes and devices.

As noted above, FIG. 6 is a block diagram of an example processor platform 600 capable of executing instructions to implement the example methods of FIGS. 3 and 4A-4B and the example queueing systems 200 and 500 of FIGS. 2 and 5. In various aspects, the processor platform 600 is, by way of example, a server, a desktop computer, a laptop computer, display device, terminal, mobile device (e.g., a tablet computer, such as an iPad™), or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer, speakers, etc.). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

Figure 6:
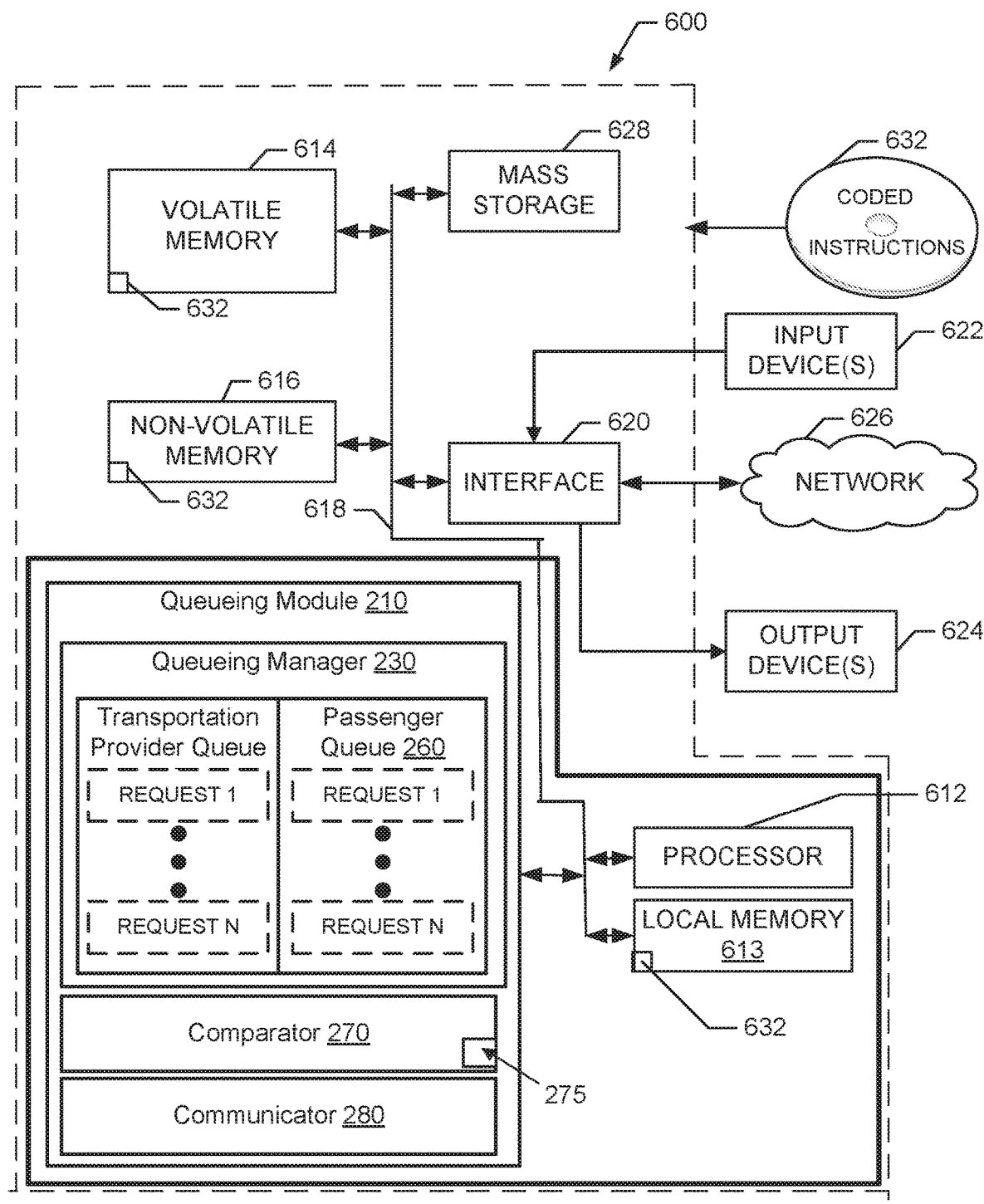
FIG. 6 is a block diagram of an example processor platform that may execute instructions to implement the methods of FIGS. 3-4B and the apparatus of FIGS. 2 and 5.

Coded instructions 632 of FIG. 6, represented generally in FIG. 3 or 4A-4B, or in any other methods and processes disclosed herein, may be stored in the mass storage device 628, in the volatile memory 614, in the non-volatile memory 616, and/or on a removable tangible computer readable storage medium such as a CD or DVD.

In view of the examples disclosed herein, passengers are not required to wait in a physical queue 100, such as is shown in FIG. 1. Instead, transportation providers and passengers are free to select their own convenient pick-up location, which distributes pick-ups amongst multiple locations, increasing efficiency and decreasing waiting time. Additionally, the queueing apparatus and methods disclosed herein enable different transportation providers to share the same infrastructure without a need to share a cloud platform.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for providing transportation services for multiple users in a pick-up area, comprising:
    queuing in a first queue, first broadcast messages received from passenger mobile devices;
    queuing in a second queue, second broadcast messages received from transportation provider mobile devices associated with transportation providers offering services at the pick-up area, the first queue and the second queue stored by a first one of the transportation provider mobile devices in the pick-up area; and
    comparing, via a first processor of the first one of the transportation provider mobile devices, each of the first broadcast messages in the first queue to the second broadcast messages in the second queue;
    identifying a first match between a first one of the first broadcast messages and a first one of the second broadcast messages based on the comparison;
    identifying a second match between a second one of the first broadcast messages and a second one of the second broadcast messages based on the comparison;
    in response to a first passenger associated with the first match accepting a first offer for transportation service, sending a first service location to the first passenger; and
    in response to a second passenger associated with the second match accepting a second offer for the transportation service, sending a second service location to the second passenger, the first service location different than the second service location, the first service location and the second service location selected to enable simultaneous boarding of the first passenger in a first vehicle associated with the first one of the transportation provider mobile devices and the second passenger in a second vehicle associated with a second one of the transportation provider mobile devices; and
    in response to identifying a movement of the first one of the transportation provider mobile devices out of the pick-up area, transmitting, via a transmitter of the first one of the transportation provider mobile devices, the first queue, the second queue, and a queueing module role from the first one of the transportation provider mobile devices to a third one of the transportation provider mobile devices in the pick-up area, the queueing module role enabling a second processor of the third one of the transportation provider mobile devices to compare the first broadcast messages in the first queue to the second broadcast messages in the second queue to identify matches between the first broadcast messages and the second broadcast messages.

2. The method of claim 1, further including sending the first offer for the transportation service to a passenger mobile device corresponding to the first one of the first broadcast messages.

3. The method of claim 2, further including:
    receiving a first acceptance of the first offer for the transportation service from the passenger mobile device.

4. The method of claim 3, further including:
    sending requirements of a passenger request to a transportation provider mobile device corresponding to the first one of the second broadcast messages;
    receiving a second acceptance of the requirements of the passenger request from the transportation provider mobile device; and
    removing the first one of the first broadcast messages from the first queue; and
    removing the first one of the second broadcast messages from the second queue.

5. The method of claim 1, wherein the first broadcast messages include transportation needs of the first passenger and the second broadcast messages include transportation characteristics of services providers corresponding to the transportation provider mobile devices.

6. The method of claim 1, wherein the first broadcast messages and the second broadcast messages are short range wirelessly transmitted messages.

7. The method of claim 1, wherein at least one vehicle associated with the second broadcast messages is an autonomous vehicle.

8. An apparatus for providing transportation services for multiple users in a pick-up area, comprising:
    a first transceiver; and
    a first device to receive transportation provider messages from transportation providers and passenger requests from passenger mobile devices, the first device including:

a queueing manager to:
  store the transportation provider messages in a first queue; and
  store the passenger requests in a second queue;
a comparator to determine matches between the transportation provider messages and the passenger requests; and
a communicator to transmit, via the first transceiver to a passenger mobile device of the passenger mobile devices, the passenger mobile device corresponding to a selected one of the passenger requests, responsive to a match between the selected one of the passenger requests and a selected one of the transportation provider messages, transportation provider information corresponding to the selected one of the transportation provider messages, the first transceiver and the first device are within a first vehicle corresponding to a first one of the transportation providers and further including a second transceiver and a second device within a second vehicle corresponding to a second one of the transportation providers,
wherein the queueing manager is to, via the first transceiver, transmit the first queue the second queue, and a queueing module role from the first device to the second device in response to a predetermined control transfer condition, the predetermined control transfer condition includes movement of the first vehicle away from a predetermined area in which the second vehicle is located, the queueing module role enabling the second device to compare the transportation provider messages in the first queue to the passenger requests in the second queue to identify matches between the transportation provider messages and the passenger requests.

9. The apparatus of claim 8, wherein the first device is further to select, via the queueing manager, another one of transportation provider messages or another one of the passenger requests responsive to a determination by the comparator that the selected one of the transportation provider messages and the selected one of the passenger requests do not match.

10. The apparatus of claim 8, wherein the transportation provider information includes transportation provider offer terms.

11. The apparatus of claim 10, wherein the first device is further to:
receive, via the communicator, an acceptance of the transportation provider offer terms;
transmit to the passenger mobile device or a third one of transportation providers corresponding to the transportation provider offer terms, via the communicator, a service location; and
update the first queue and the second queue, via the queueing manager, to remove the selected one of the transportation provider messages and the selected one of the passenger requests.

12. The apparatus of claim 10, wherein the first device is further to:
receive a rejection of the transportation provider offer terms via the queueing manager; and
reposition, in response to the rejection, the selected one of the transportation provider messages or the selected one of the passenger requests to a different position in a respective one of the first queue or the second queue.

13. The apparatus of claim 8, wherein the comparator determine matches between the transportation provider messages and the passenger requests using a first-in-first-out queueing algorithm.

14. The apparatus of claim 8, wherein the first transceiver includes a short range wireless transceiver.

15. A tangible computer-readable storage medium comprising instructions that, when executed, cause a processor to, at least:
queue in a first queue, first broadcast messages received from passenger mobile devices;
queue in a second queue, second broadcast messages received from transportation provider mobile devices associated with transportation providers offering services at a pick-up area, the first queue and the second queue stored by a first one of the transportation provider mobile devices in the pick-up area; and
compare, via the processor, each of the first broadcast messages in the first queue to the second broadcast messages in the second queue:
identify a first match between one of the first broadcast messages and one of the second broadcast messages based on the comparison;
identifying a second match between one of the first broadcast messages and one of the second broadcast messages based on the comparison;
in response to a first passenger associated with the first match accepting a first offer for transportation, sending a first service location to the first passenger; and
in response to a second passenger associated with the second match accepting a second offer for transportation, sending a second service location to the second passenger, the first service location different than the second service location, the first service location and the second service location selected to enable simultaneous boarding of the first passenger in a first vehicle associated with the first one of the transportation provider mobile devices and the second passenger in a second vehicle associated with a second one of the transportation provider mobile devices; and
in response to identifying a movement of the first one of the transportation provider mobile devices out of the pick-up area, transmit, via a transmitter of the first one of the transportation provider mobile devices, the first queue, the second queue, and a queueing module role from the first one of the transportation provider mobile devices to a third one of the transportation provider mobile devices in the pick-up area, the queueing module role enabling the third one of the transportation provider mobile devices to compare the first broadcast messages in the first queue to the second broadcast messages in the second queue to identify matches between the first broadcast messages and the second broadcast messages.

16. The tangible computer-readable storage medium as defined in claim 15, wherein the instructions, when executed, further cause the processor to:
send the first offer for transportation service to a passenger mobile device corresponding to a selected one of the first broadcast messages determined to match with a selected one of the second broadcast messages.

* * * * *